United States Patent
Huang et al.

(10) Patent No.: US 9,977,696 B2
(45) Date of Patent: May 22, 2018

(54) METHODS AND APPARATUS OF ADAPTIVE MEMORY PREPARATION

(71) Applicant: MediaTek Inc., Hsinchu (TW)

(72) Inventors: Tsung-Chieh Huang, Taipei (TW);
Wen-Hung Su, New Taipei (TW);
Tung-Ying Lin, New Taipei (TW)

(73) Assignee: MEDIATEK INC., Hsin-Chu (TW)

( * ) Notice: Subject to any disclaimer, the term of this patent is extended or adjusted under 35 U.S.C. 154(b) by 91 days.

(21) Appl. No.: 15/139,309

(22) Filed: Apr. 26, 2016

(65) Prior Publication Data

US 2016/0239236 A1 Aug. 18, 2016

Related U.S. Application Data

(60) Provisional application No. 62/197,194, filed on Jul. 27, 2015.

(51) Int. Cl.
*G06F 9/46* (2006.01)
*G06F 9/50* (2006.01)
*G06F 9/54* (2006.01)

(52) U.S. Cl.
CPC ............ *G06F 9/5016* (2013.01); *G06F 9/544* (2013.01); *Y02B 60/142* (2013.01)

(58) Field of Classification Search
CPC ...... G06F 9/5016; G06F 9/544; Y02B 60/142
See application file for complete search history.

(56) References Cited

U.S. PATENT DOCUMENTS

| | | | | |
|---|---|---|---|---|
| 5,175,854 A | * | 12/1992 | Cheung | G06F 9/4843 718/100 |
| 5,794,040 A | * | 8/1998 | Ono | G06F 8/30 717/100 |
| 5,838,976 A | * | 11/1998 | Summers | G06F 11/3466 714/E11.2 |
| 6,463,509 B1 | | 10/2002 | Teoman et al. | |
| 7,426,720 B1 | | 9/2008 | Fresko | |
| 2013/0254383 A1 | * | 9/2013 | Wray | H04L 47/70 709/224 |
| 2016/0055016 A1 | * | 2/2016 | Beveridge | G06F 9/45558 718/1 |
| 2016/0070587 A1 | * | 3/2016 | Saladi | G06F 9/45558 718/1 |

* cited by examiner

*Primary Examiner* — Camquy Truong
(74) *Attorney, Agent, or Firm* — Han IP Corporation; Andy M. Han

(57) ABSTRACT

A technique, as well as select implementations thereof, pertaining to adaptive memory preparation is described. The technique may involve analyzing memory usage data of a plurality of child processes of a parent process. The technique may also involve determining whether a shared memory space is to be prepared by the parent process for use by at least a first child process based at least in part on the analyzing.

17 Claims, 9 Drawing Sheets

METHODS AND APPARATUS OF ADAPTIVE MEMORY PREPARATION

CROSS REFERENCE TO RELATED PATENT APPLICATIONS

The present disclosure claims the priority benefit of U.S. Provisional Patent Application No. 62/197,194, filed on 27 Jul. 2015, which is incorporated by reference in its entirety.

TECHNICAL FIELD

The present disclosure is generally related to memory usage in computing and, more particularly, to techniques, methods and apparatus of adaptive memory preparation.

BACKGROUND

Unless otherwise indicated herein, approaches described in this section are not prior art to the claims listed below and are not admitted to be prior art by inclusion in this section.

Application processes in some computer operating systems, such as Linux, generally employ a memory sharing scheme for a parent process and its child processes, so as to reduce the total amount of memory used by the parent and child processes. For instance, in a conventional approach as shown in scenario 800 of FIG. 8, a parent process 810 prepares a memory space 830 that is used by and/or shared with a child process 820 created by the parent process 810. As the memory space 830 prepared by parent process 810 is used by/shared with child process 820, the idea is that only one copy of shared memory (i.e., memory space 830 prepared by parent process 810) exists and occupies actual space in a memory device such as a random-access memory (RAM) since child process 820 needs not prepare a separate memory space (e.g., non-shared memory space 840) for its own use. FIG. 9 illustrates typical scenarios under another conventional approach 900. In scenario 910, there are multiple child processes created by the parent process and the parent process prepares a union set of memory spaces for use by the multiple child processes. However, as shown in scenario 920, when the number of child processes created is small, some of the memory spaces prepared by the parent process may be unused. Undesirably, this is inefficient use of memory. Besides, as it takes computing time and power to prepare each memory space, unused memory space(s) also means wasted computing time and power.

SUMMARY

The following summary is illustrative only and is not intended to be limiting in any way. That is, the following summary is provided to introduce concepts, highlights, benefits and advantages of the novel and non-obvious techniques described herein. Select, not all, implementations are further described below in the detailed description. Thus, the following summary is not intended to identify essential features of the claimed subject matter, nor is it intended for use in determining the scope of the claimed subject matter.

The present disclosure aims to address issues associated with the conventional approach with a novel technique of adaptive memory preparation. Advantageously, in implementations in accordance with the present disclosure, the aforementioned inefficient use of memory as well as waste in computing time and power associated with the convention approach can be avoided or at least minimized.

In one example implementation, a method may involve analyzing memory usage data of a plurality of child processes of a parent process. The method may also involve determining whether a shared memory space is to be prepared by the parent process for use by at least a first child process based at least in part on the analyzing.

In another example implementation, a method may involve collecting memory usage data of a plurality of child processes of a parent process and determining a need to start a first child process of the plurality of child processes. The method may also involve starting the parent process, which starts the first child process, without the parent process preparing a shared memory space to be shared with at least the first child process such that the first child process prepares a first memory space that is used by the first child process. The method may further involve analyzing the collected memory usage data of the plurality of child processes. The method may additionally involve determining whether the shared memory space is to be prepared based at least in part on the analyzing. If the shared memory space is determined to be prepared, the shared memory space may be prepared by the parent process.

In yet another example implementation, an apparatus may include a usage collection module, a memory preparation module, a decision module and a control module. The usage collection module may be configured to maintain a record of memory usage data of a plurality of child processes of a parent process and whether any child process of the plurality of child processes is about to be started. The memory preparation module may be configured to prepare a memory space associated with the parent process. The decision module may be configured to adaptively decide whether a shared memory space needs to be prepared according to the record maintained by the usage collection module. The control module may be configured to start the parent process responsive to a determination that at least one child process of the plurality of child processes is to be started.

BRIEF DESCRIPTION OF THE DRAWINGS

The accompanying drawings are included to provide a further understanding of the disclosure, and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED EMBODIMENTS

Overview

In various implementations in accordance with the present disclosure, the determination of whether to prepare shared memory space(s) for use by one or more child processes of a parent process may be decided according to a record of data on memory usage by the child processes of the parent process. For example, if the record indicates there is less than a threshold amount (e.g., K1) of child processes running then there may be no shared memory space prepared by the parent process. That is, the parent process may start or otherwise create one or more child processes without preparing a shared memory space for the one or more child processes to use and, as a result, each of the one or more child processes may prepare a respective non-shared memory space for its own use. As another example, if, however, the record indicates there is more than the threshold amount (K1) of child processes running for at least a threshold amount (e.g., K2) of time then the parent process may prepare memory space(s) for shared use. As yet another example, if the record indicates there is less than the threshold amount (K1) of child processes running for less than the threshold amount (K2) of time then the parent process may not prepare memory space(s) for shared use. The threshold amount (K2) of time could be zero or any other numbers. The parent process may prepare the memory space(s) for shared use before, during, or after starting a child process. In some implementations, the parent process may not be started unless a child process is to be started and, correspondingly, the parent process may be stopped when no child process is running. In other words, when there is no need for any child process to be running, the parent process may be stopped until one of its child processes is about to be started, at which time the parent process may be started for it to start or otherwise create the child process in need of being started. In some implementations, when there is no record of data on memory usage, the parent process may not prepare a shared memory space for the one or more child processes to use and, as a result, each of the one or more child processes may prepare a respective non-shared memory space for its own use when each child process is started.

Figure 1:
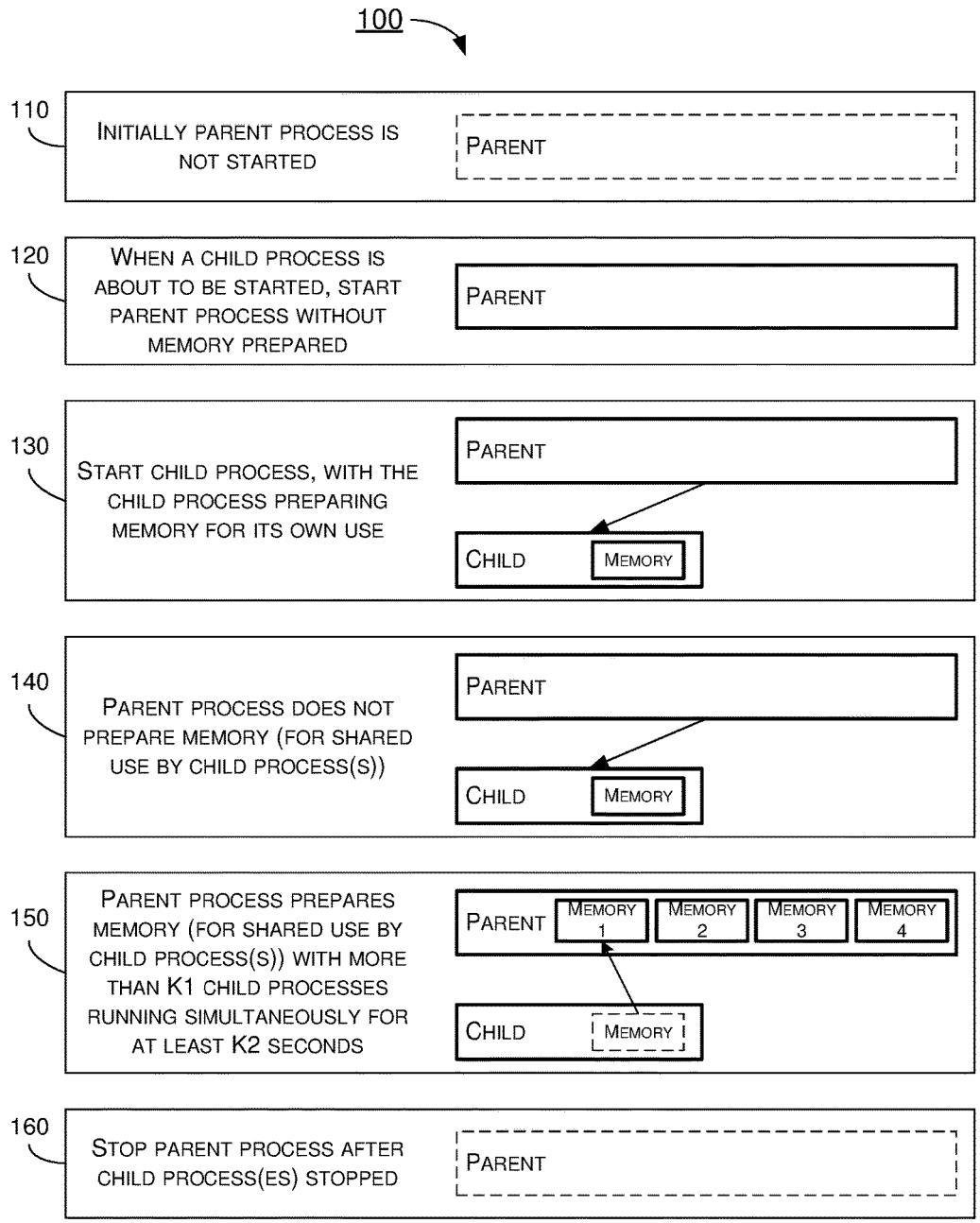
FIG. 1 is a diagram of an example scheme in accordance with an implementation of the present disclosure.

FIG. 1 illustrates an example scheme 100 in accordance with an implementation of the present disclosure. Scheme 100 may involve one or more operations, actions and/or stages, such as stages 110, 120, 130, 140, 150 and 160. Although illustrated as discrete stages, various stages of scheme 100 may be divided into additional sub-stages, combined into fewer blocks, or eliminated, depending on the desired implementation. The stages may occur in the order shown in FIG. 1 or in a different order, depending on the actual implementation and/or requirements. The various stages of scheme 100 may occur in a processor such as, for example and not limited to, a central processing unit (CPU), where an operating system is executed or run by the processor. The operating system may be, for example and not limited to, Linux, Unix or any multitasking operating system that starts or otherwise creates a parent process which in turn starts or otherwise creates one or more child processes.

In stage 110, initially a parent process may not be started. In stage 120, when there is a need to start a child process, the parent process may be started. Unlike the conventional approach in which the parent process prepares one or more memory spaces regardless of the status of child process(es), in stage 120 the parent process may not automatically prepare a memory space intended for use by any child process. In stage 130, the parent process starts or otherwise creates a child process. Again, unlike the conventional approach, here in stage 130 of scheme 100 the parent process may still not prepare a memory space for use by the child process. Accordingly, the child process may prepare a non-shared memory space that is for the use of the child process itself.

In accordance with the present disclosure, data on memory usage may be maintained or otherwise collected, and may include data on how many child process(es) of a plurality of child processes running simultaneously for how long. In some implementations, the data on memory usage may include one or more additional types of data such as, for example and not limited to, the following types of data: how many times a memory space prepared by a parent process is used, the frequency of the memory space(s) prepared by the parent process being used, whether the same memory space or segment is accessed by more than one child process of the plurality of child processes, whether more than one child process of the plurality of child processes need the same type of data, and/or data indicating that a memory segment should be shared among more than one child process of the plurality of child processes. In stage 140, when data on memory usage by child processes of the parent process indicates less than a threshold amount (e.g., K1) of child processes had been executed/run simultaneously after being started by the parent process, the parent process may not prepare a shared memory space for use by the child process (es) that has/have been started by the parent process. In stage 150, when data on memory usage by child processes of the parent process indicates more than K1 child processes had been executed/run simultaneously for at least K2 seconds after being started by the parent process, the parent process may prepare one or more shared memory spaces. K2 may be zero or any other numbers. The parent process may prepare the one or more shared memory spaces before, during, or after starting the first child process. In some instances, when the data on memory usage indicates there is less than K1 child processes running for less than K2 seconds then the parent process may not prepare memory space(s) for shared use. In some instances, when there is no record of data on memory usage, the parent process may not prepare a shared memory space for the one or more child processes to use and, as a result, each of the one or more child processes may prepare a respective non-shared memory space for its own use when each child process is started. In stage 160, after all child processes have been stopped, the parent process may also be stopped.

Advantageously, under scheme 100 the aforementioned inefficient use of memory as well as waste in computing time and power associated with the convention approach can be avoided or at least minimized. That is, the likelihood of the parent process preparing memory space(s) that end up being unused by one or more child processes is minimized. The determination of whether or not for the parent process to prepare memory space(s) for use by its child process(es) may depend on data on memory usage which may be updated with new data on recent memory usage. This allows the decision on memory preparation to be both predictive and adaptive. Moreover, as the parent process may be stopped when there is no need for any of its child processes, scheme 100 also improves overall power saving.

Example Implementations

Figure 2:
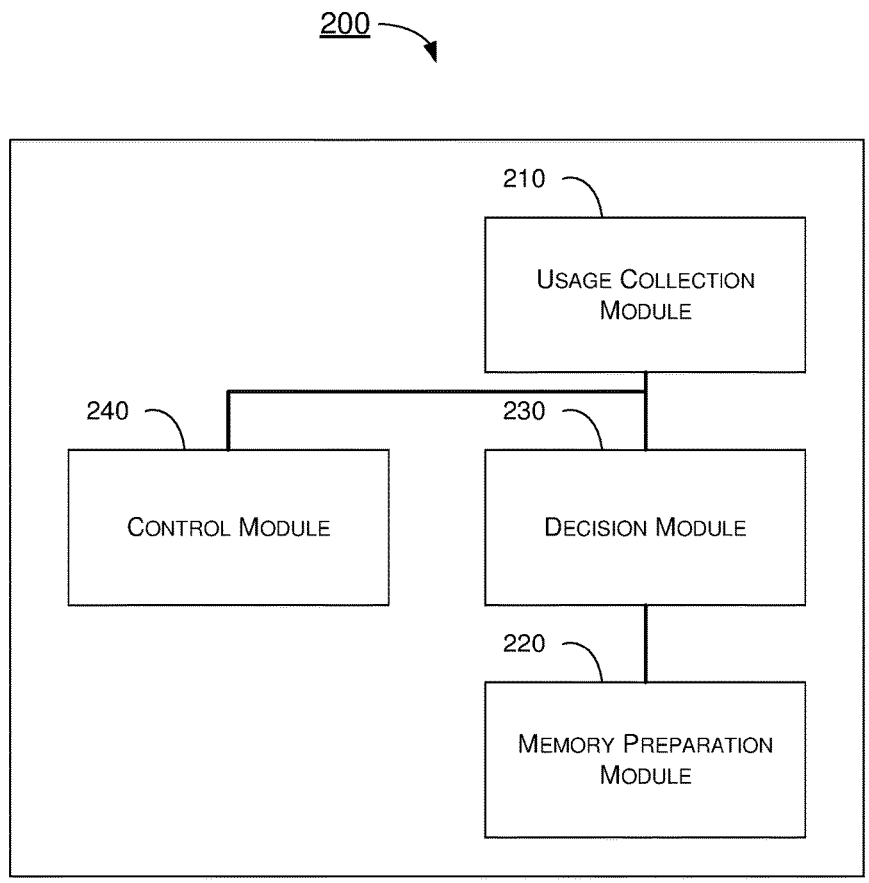
FIG. 2 is a diagram of an example device in accordance with an implementation of the present disclosure.

FIG. 2 illustrates an example device 200 in accordance with an implementation of the present disclosure. Device 200 may perform various functions to implement techniques, schemes and methods described herein, including scheme 100 described above as well as algorithm 400 and processes 500 and 600 described below. In some implementations, device 200 may be implemented in the form of a single integrated-circuit (IC) chip or a chipset of multiple IC chips. For instance, device may be a CPU or an application-specific integrated circuit (ASIC) which may be installed in an apparatus such as a smartphone, smartwatch, a computing device (e.g., a tablet computer, a laptop computer, a notebook computer), a wearable device, or an Internet of Things (IoT) device. Device 200 may include at least those components shown in FIG. 2, such as a usage collection module 210, a memory preparation module 220, a decision module 230 and a control module 240. Each of usage collection module 210, memory preparation module 220, decision module 230 and control module 240 may be implemented in the form of hardware, software, middleware, firmware or any combination thereof. For example, at least one of collection module 210, memory preparation module 220, decision module 230 and control module 240 may be implemented in software form. As another example, at least one of collection module 210, memory preparation module 220, decision module 230 and control module 240 may be implemented in hardware form.

Usage collection module 210 may be configured to maintain a record of memory usage data of a plurality of child processes of a parent process and whether any child process of the plurality of child processes is about to be started. In some implementations, the record of memory usage data may indicate how many child process(es) of the plurality of child processes running simultaneously for how long. In some implementations, the record of memory usage data may include one or more additional types of data such as, for example and not limited to, the following types of data: how many times a memory space prepared by the parent process is used, the frequency of the memory space(s) prepared by the parent process being used, whether the same memory space or segment is accessed by more than one child process of the plurality of child processes, whether more than one child process of the plurality of child processes need the same type of data, and/or data indicating that a memory segment should be shared among more than one child process of the plurality of child processes. Memory preparation module 220 may be configured to prepare a memory space associated with the parent process. Decision module 230 may be configured to adaptively decide whether a shared memory space needs to be prepared according to the record maintained by usage collection module 210. Control module 240 may be configured to start the parent process. In some implementations, the parent process may be started responsive to a determination by control module 240 that at least one child process of the plurality of child processes is to be started. In some implementations, the parent process may be stopped by control module 240 responsive to a determination that all child processes have been stopped.

In some implementations, control module 240 may be configured to determine a need to start a first child process of the plurality of child processes. For example, the control module 240 may determine the need to start the first child process before the parent process has been started. As another example, the control module 240 may determine the need to start the first child process when the parent process is being started or after the parent process has been started. As yet another example, the control module 240 may receive a signal indicating the need to start the first child process before the parent process has been started, when the parent process is being started, or after the parent process has been started. Control module 240 may be also configured to start the parent process, which starts the first child process, without the parent process preparing the shared memory space to be shared with at least the first child process such that the first child process prepares a first memory space that is used by the first child process. Additionally, control module 240 may be also configured to start one or more child processes of the plurality of child processes in addition to the first child process without the parent process preparing the shared memory space such that each of the one or more child processes prepares a respective memory space that is used by the respective child process. In some implementations, control module 240 may be further configured to stop the parent process after the first child process and each of the one or more child processes have stopped.

In some implementations, decision module 230 may be configured to trigger memory preparation module 220 to prepare the shared memory space that is shared by two or more of the first child process and the one or more child processes in response to a quantity of the first child process plus the one or more child processes exceeding a first threshold amount (e.g., K1) and an amount of time that the first child process and the one or more child processes have run simultaneously exceeding a second threshold amount (e.g., K2). In some implementations, when the record maintained by usage collection module 210 indicates there is less than a first threshold amount (e.g., K1) of child processes running for less than a second threshold amount (e.g., K2) of time then decision module 230 may determine that no memory space is to be prepared for shared use. In some implementations, when there is no record of data on memory usage, the parent process may not prepare a shared memory space for the one or more child processes to use and, as a result, each of the one or more child processes may prepare a respective non-shared memory space for its own use when each child process is started.

In some implementations, decision module 230 may be configured to adaptively decide whether a shared memory space needs to be prepared according to the record maintained by usage collection module 210. For instance, decision module 230 may determine whether the record indicates at least a first threshold amount (e.g., K1) of child processes of the plurality of child processes have run simultaneously for at least a second threshold amount (e.g., K2) of time based on the collected memory usage data. Moreover, decision module 230 may be further configured to trigger memory preparation module 220 to prepare the shared memory space that is shared by at least the first child process in response to the record indicating at least the first threshold amount of child processes of the plurality of child processes have run simultaneously for at least the second threshold amount of time based on the collected memory usage data.

Figure 3:
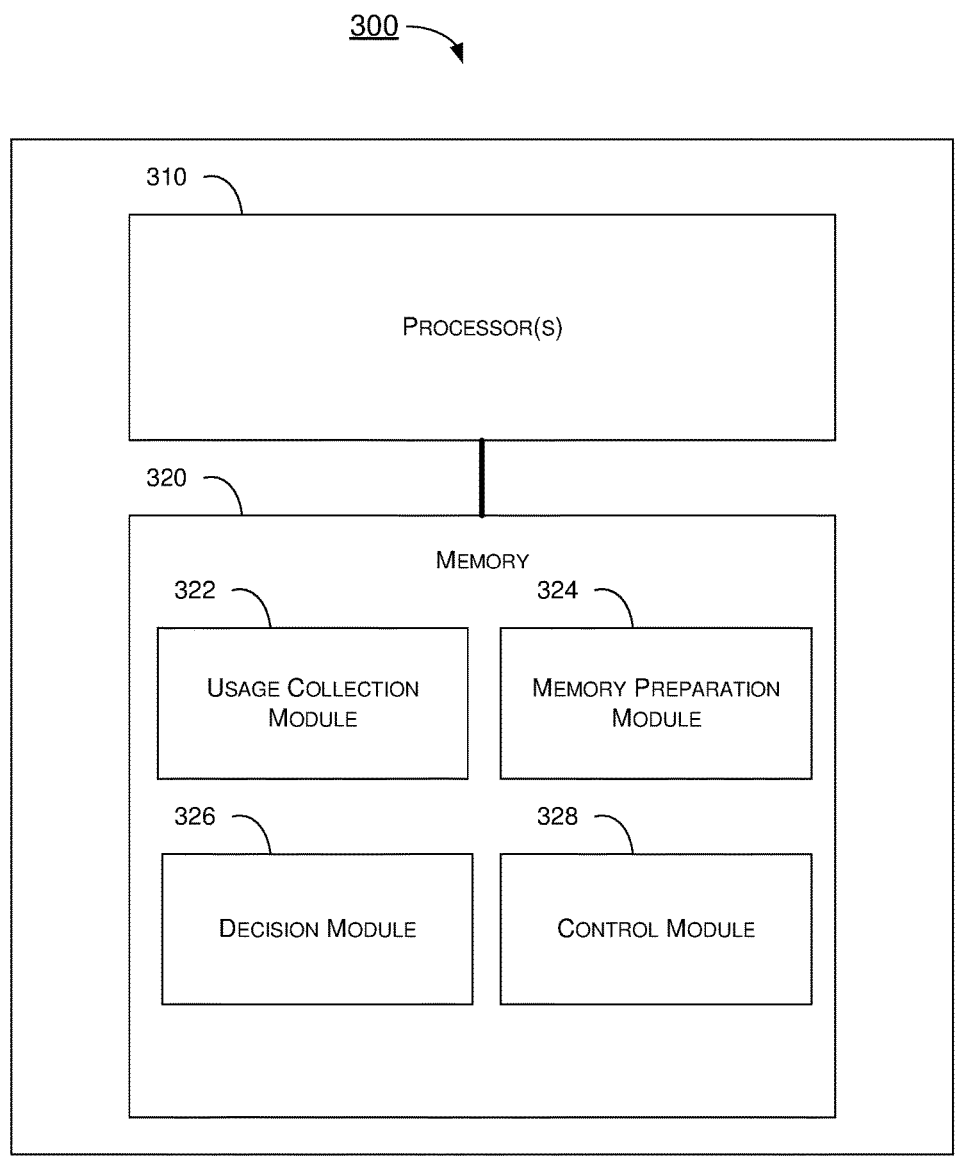
FIG. 3 is a diagram of an example apparatus in accordance with an implementation of the present disclosure.

FIG. 3 illustrates an example apparatus 300 in accordance with an implementation of the present disclosure. Apparatus 300 may perform various functions to implement techniques, schemes and methods described herein, including scheme 100 described above as well as algorithm 400 and processes 500 and 600 described below. In some implementations, apparatus 300 may be an electronic apparatus which may be a computing apparatus, a portable apparatus or a wearable apparatus. For instance, apparatus 300 may be a smartphone, smartwatch, a computing device such as a tablet computer, a laptop computer, a notebook computer, a wearable device, or an IoT device. Apparatus 300 may include at least those components shown in FIG. 3, such as one or more processors 310 and a memory device 320 coupled to processor(s) 310. Memory device may include one or more computer-readable mediums such as a type of read-only memory (ROM) or random-access memory (RAM). For example, memory device 320 may include a dynamic RAM (DRAM), static RAM (SRAM), thyristor RAM (T-RAM), zero-capacitor RAM (Z-RAM) or another type of volatile memory. As another example, memory device may include mask ROM, programmable ROM (PROM), erasable programmable ROM (EPROM), electrically-erasable programmable ROM (EEPROM), flash memory, solid-state memory or another type of non-volatile memory.

Memory device 320 may be configured to store a number of software modules therein, including a usage collection module 322, a memory preparation module 324, a decision module 326 and a control module 328. Each of usage collection module 322, memory preparation module 324, decision module 326 and control module 328 may be an example implementation of usage collection module 210, memory preparation module 220, decision module 230 and control module 240 in software form, respectively. That is, upon execution by processor(s) 310, usage collection module 322, memory preparation module 324, decision module 326 and control module 328 may cause processor(s) 310 to perform operations similar to those described above with respect to usage collection module 210, memory preparation module 220, decision module 230 and control module 240 described above. Therefore, in the interest of brevity a detailed description of the functionality of usage collection module 322, memory preparation module 324, decision module 326 and control module 328 is not provided so as to avoid redundancy.

Figure 4:
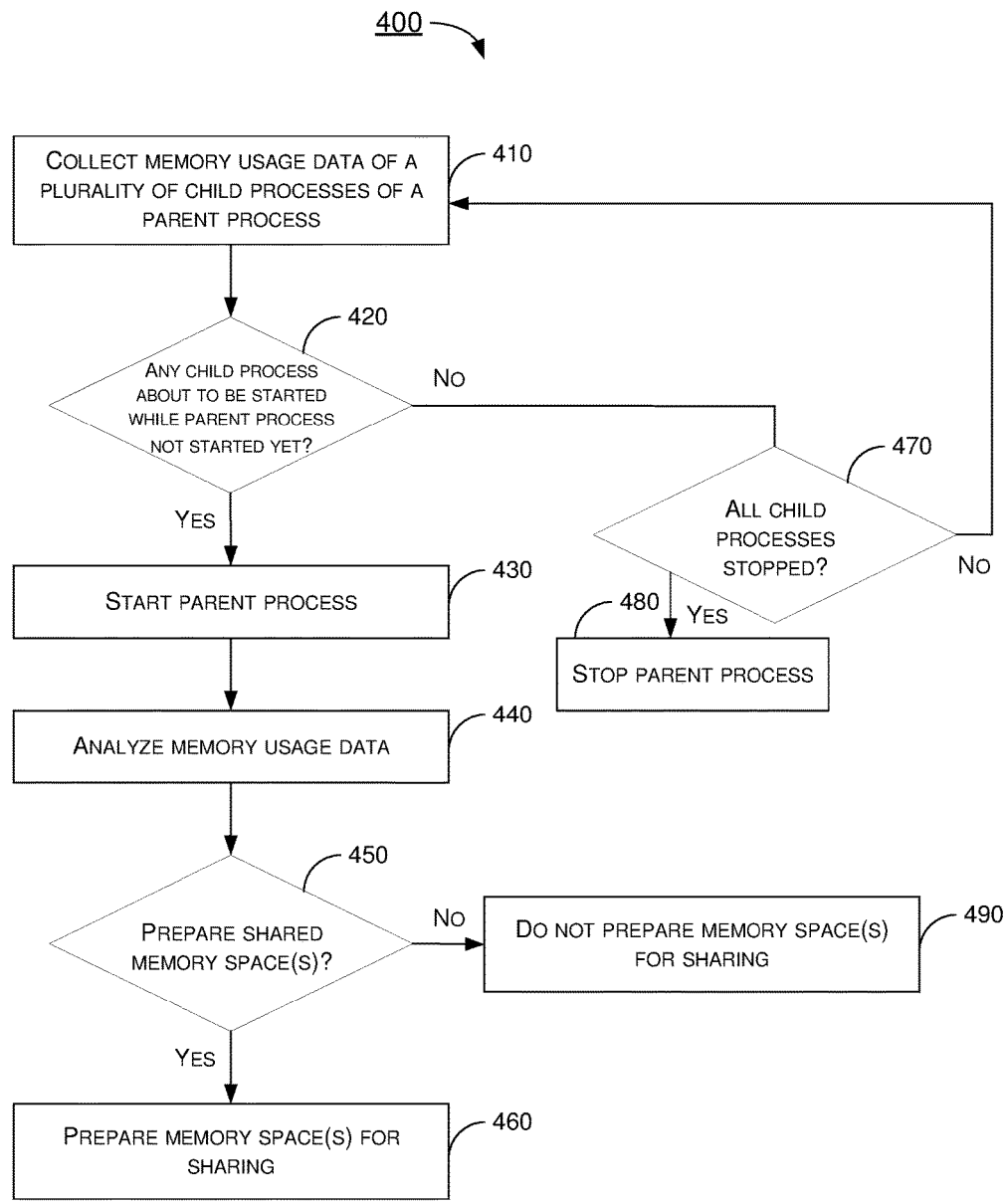
FIG. 4 is a diagram of an example algorithm in accordance with an implementation of the present disclosure.

FIG. 4 illustrates an example algorithm 400 in accordance with an implementation of the present disclosure. Algorithm 400 may include one or more operations, actions, or functions as represented by one or more blocks such as blocks 410, 420, 430, 440, 450, 460, 470, 480 and 490. Although illustrated as discrete blocks, various blocks of algorithm 400 may be divided into additional blocks, combined into fewer blocks, or eliminated, depending on the desired implementation. The blocks of algorithm 400 may be performed in the order shown in FIG. 4 or in any other order, depending on the desired implementation. Algorithm 400 may be implemented by device 200 and/or apparatus 300. Algorithm 400 may start at 410.

At 410, data on memory usage by a plurality of child processes of a parent process may be collected (e.g., by usage collection module 210 of device 200 and/or usage collection module 322 of apparatus 300). In some implementations, the data on memory usage may include one or more types of data such as, for example and not limited to, how many child process(es) of the plurality of child processes running simultaneously for how long, how many times a memory space prepared by the parent process is used, the frequency of the memory space(s) prepared by the parent process being used, whether the same memory space or segment is accessed by more than one child process of the plurality of child processes, whether more than one child process of the plurality of child processes need the same type of data, and/or data indicating that a memory segment should be shared among more than one child process of the plurality of child processes. Algorithm 400 may proceed from 410 to 420.

At 420, a determination may be made as to whether a child process is about to be started while the parent process has not yet been started. This determination may be made by control module 240 of device 200 and/or control module 328 of apparatus 300. In an event that it is determined that a child process is about to be started while the parent has not yet been started, algorithm 400 may proceed from 420 to 430. Otherwise, algorithm 400 may proceed from 420 to 470.

At 430, the parent process may be started. This may be performed by control module 240 of device 200 and/or control module 328 of apparatus 300. Algorithm 400 may proceed from 430 to 440.

At 440, the collected data on memory usage may be analyzed. This may be performed by decision module 230 of device 200 and/or decision module 326 of apparatus 300. Algorithm 400 may proceed from 440 to 450.

At 450, a determination may be made, based at least in part on the analysis performed at 440, as to whether to prepare shared memory space(s) (e.g., for one or more child processes that has/have been started, or that is/are anticipated to be started, by the parent process). In an event that the determination is positive, algorithm 400 may proceed from 450 to 460; otherwise, algorithm 400 may proceed from 450 to 490.

At 460, one or more memory space(s) may be prepared for use by one or more child processes that has/have been started and/or is/are to be started by the parent process. The shared memory space(s) may be prepared by the parent process.

At 470, a determination may be made as to whether all child processes of the parent process have been stopped. In an event of a positive determination, algorithm 400 may proceed from 470 to 480; otherwise, algorithm 400 may proceed from 470 to 410.

At 480, the parent process may be stopped.

At 490, no shared memory space may be prepared. Accordingly, each of the one or more child processes that has/have been started or is/are to be started by the parent process may be to prepare a respective memory space for its own use.

Figure 5:
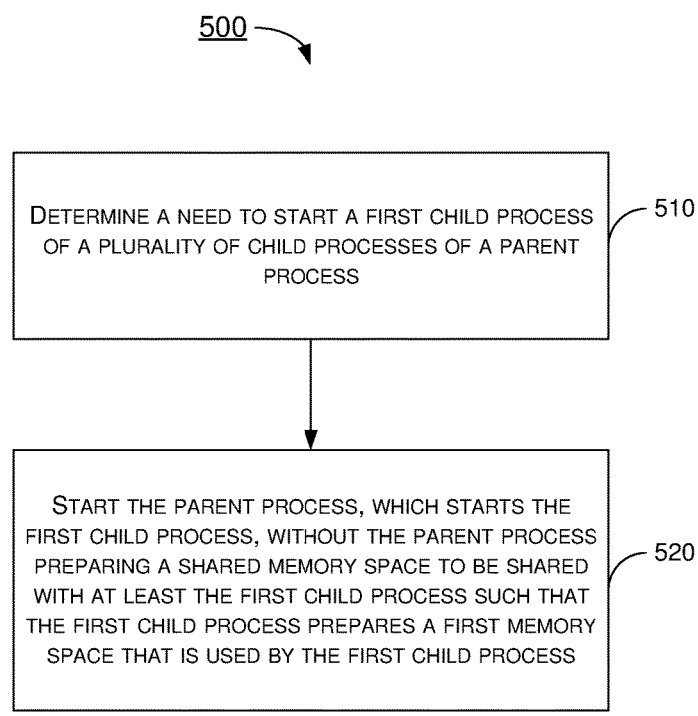
FIG. 5 is a flowchart of an example process in accordance with an implementation of the present disclosure.

FIG. 5 illustrates an example process 500 in accordance with an implementation of the present disclosure. Process 500 may include one or more operations, actions, or functions as represented by one or more blocks such as blocks 510 and 520. Although illustrated as discrete blocks, various blocks of process 500 may be divided into additional blocks, combined into fewer blocks, or eliminated, depending on the desired implementation. The blocks may be performed in the order shown in FIG. 5 or in any other order, depending on the desired implementation. Process 500 may be implemented by device 200 and/or apparatus 300. Solely for illustrative purpose and without limiting the scope of the present disclosure, process 500 is described below in the context of process 500 being performed by apparatus 300. Process 500 may begin at 510.

At 510, process 500 may involve processor(s) 310 of apparatus 300 determining a need to start a first child process of a plurality of child processes of a parent process before the parent process has been started. In other examples, the process 500 may involve processor(s) 310 of apparatus 300 determining the need to start the first child process during the parent process is being started or after the parent process has been started. In some implementations, the determining of the need to start the first child process may involve processor(s) 310 of apparatus 300 actively detecting whether there is a need to start the first child process and/or passively receiving a signal (e.g., from an operating system) indicating the need to start the first child process. This may refer to stages 110 and 120 of scheme 100, where no parent process and no child process have been started, and a need to start a first child process is determined. Process 500 may proceed from 510 to 520.

At 520, process 500 may involve processor(s) 310 of apparatus 300 starting the parent process, which in turn starts the first child process, without the parent process preparing a shared memory space to be shared with at least the first child process such that the first child process prepares a first memory space that is used by the first child process. This may refer to stages 120, 130 and 140 of scheme 100, where the parent process is started and the parent process starts or otherwise creates a first child process without preparing a shared memory space for first child process to use. As a result, first child process prepares a first memory space for its own use.

In some implementations, process 500 may also involve processor(s) 310 of apparatus 300 starting one or more child processes of the plurality of child processes in addition to the first child process without the parent process preparing the shared memory space such that each of the one or more child processes prepares a respective memory space that is used by the respective child process. Additionally, process 500 may also involve processor(s) 310 of apparatus 300 preparing the shared memory space that is shared by two or more of the first child process and the one or more child processes in response to a quantity of the first child process plus the one or more child processes exceeding a first threshold amount and an amount of time that the first child process and the one or more child processes have run simultaneously exceeding a second threshold amount. The second threshold amount may be zero or any other numbers. Moreover, process 500 may also involve processor(s) 310 of apparatus 300 stopping the parent process after the first child process and each of the one or more child processes have stopped.

In some implementations, process 500 may further involve processor(s) 310 of apparatus 300 analyzing memory usage data of the plurality of child processes and determining whether the shared memory space is to be prepared based at least in part on the analyzing. If the shared memory space is determined to be prepared, the shared memory space may be prepared by the parent process. In some implementations, in determining whether the shared memory space is to be prepared based at least in part on the analyzing, process 500 may involve processor(s) 310 of apparatus 300 determining that there is a need to prepare the shared memory space by the parent process in response to the analyzing indicating at least a first threshold amount of child processes of the plurality of child processes have run simultaneously for at least a second threshold amount of time based on the memory usage data. Additionally, process 500 may additionally involve processor(s) 310 of apparatus 300 preparing the shared memory space that is shared by at least the first child process in response to a determination that there is a need to prepare the shared memory space by the parent process based on the analyzing.

In some implementations, when there is less than the first threshold amount of child processes running for less than the second threshold amount of time then there may be no preparation of memory space for shared use. In some implementations, when there is no record of data on memory usage, the parent process may not prepare a shared memory space for the one or more child processes to use and, as a result, each of the one or more child processes may prepare a respective non-shared memory space for its own use when each child process is started.

Figure 6:
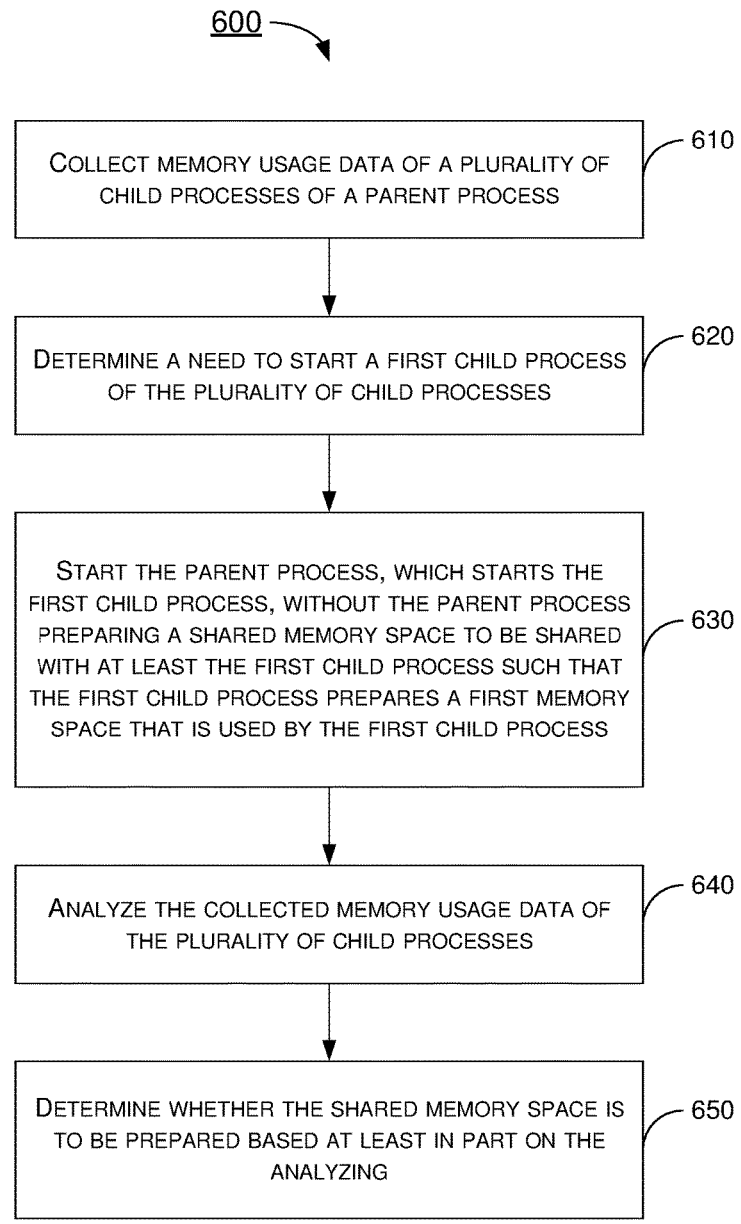
FIG. 6 is a flowchart of an example process in accordance with another implementation of the present disclosure.

FIG. 6 illustrates an example process 600 in accordance with another implementation of the present disclosure. Process 600 may include one or more operations, actions, or functions as represented by one or more blocks such as blocks 610, 620, 630, 640 and 650. Although illustrated as discrete blocks, various blocks of process 600 may be divided into additional blocks, combined into fewer blocks, or eliminated, depending on the desired implementation. The blocks may be performed in the order shown in FIG. 6 or in any other order, depending on the desired implementation. Process 600 may be implemented by device 200 and/or apparatus 300. Solely for illustrative purpose and without limiting the scope of the present disclosure, process 600 is described below in the context of process 600 being performed by device 200. Process 600 may begin at 610.

At 610, process 600 may involve usage collection module 210 of device 200 collecting memory usage data of a plurality of child processes of a parent process. In some implementations, the data on memory usage may include one or more types of data such as, for example and not limited to, how many child process(es) of the plurality of child processes running simultaneously for how long, how many times a memory space prepared by the parent process is used, the frequency of the memory space(s) prepared by the parent process being used, whether the same memory space or segment is accessed by more than one child process of the plurality of child processes, whether more than one child process of the plurality of child processes need the same type of data, and/or data indicating that a memory segment should be shared among more than one child process of the plurality of child processes. Process 600 may proceed from 610 to 620.

At 620, process 600 may involve usage collection module 210 of device 200 determining a need to start a first child process of the plurality of child processes. In some implementations, the determining of the need to start the first child process may involve usage collection module 210 actively detecting whether there is a need to start the first child process and/or passively receiving a signal (e.g., from an operating system, control module 240 or decision module 230) indicating the need to start the first child process. Process 600 may proceed from 620 to 630.

At 630, process 600 may involve control module 240 of device 200 starting the parent process, which starts the first child process, without the parent process preparing a shared memory space to be shared with at least the first child process such that the first child process prepares a first memory space that is used by the first child process. Process 600 may proceed from 630 to 640.

At 640, process 600 may involve decision module 230 of device 200 analyzing the collected memory usage data of the plurality of child processes. Process 600 may proceed from 640 to 650.

At 650, process 600 may involve decision module 230 of device 200 determining whether the shared memory space is to be prepared based at least in part on the analyzing. If the shared memory space is determined to be prepared, the shared memory space may be prepared by the parent process.

In some implementations, in determining whether the shared memory space is to be prepared based at least in part on the analyzing, process 600 may involve decision module 230 of device 200 determining that there is a need to prepare the shared memory space by the parent process in response to the analyzing indicating at least a first threshold amount of child processes of the plurality of child processes have run simultaneously for at least a second threshold amount of time based on the memory usage data collected by usage collection module 210.

In some implementations, process 600 may also involve memory preparation module 220 of device 200 preparing the shared memory space that is shared by at least the first child process in response to a determination that there is a need to prepare the shared memory space by the parent process based on a result of the analyzing done by decision module 230.

In some implementations, process 600 may further involve control module 240 of device 200 starting one or more child processes of the plurality of child processes in addition to the first child process without the parent process preparing the shared memory space such that each of the one or more child processes prepares a respective memory space that is used by the respective child process. In some implementations, process 600 may additionally involve memory preparation module 220 of device 200 preparing the shared memory space that is shared by two or more of the first child process and the one or more child processes in response to a quantity of the first child process plus the one or more child processes exceeding a first threshold amount and an amount of time that the first child process and the one or more child processes have run simultaneously exceeding a second threshold amount. Alternatively or additionally, process 600 may also involve control module 240 of device 200 stopping the parent process after the first child process and each of the one or more child processes have stopped.

In some implementations, when there is less than the first threshold amount of child processes running for less than the second threshold amount of time then there may be no preparation of memory space for shared use. In some implementations, when there is no record of data on memory usage, the parent process may not prepare a shared memory space for the one or more child processes to use and, as a result, each of the one or more child processes may prepare a respective non-shared memory space for its own use when each child process is started.

Figure 7:
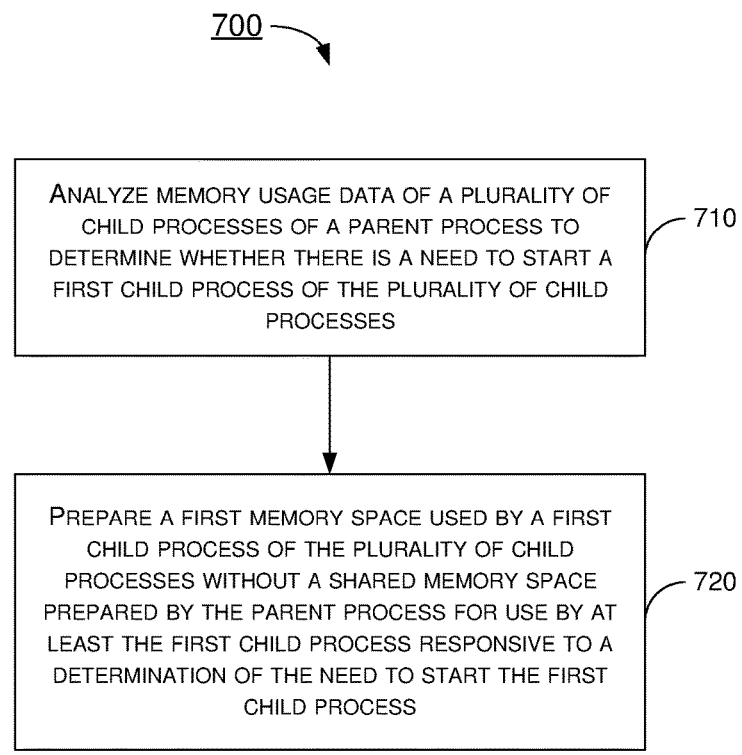
FIG. 7 is a flowchart of an example process in accordance with yet another implementation of the present disclosure.
Figure 8:
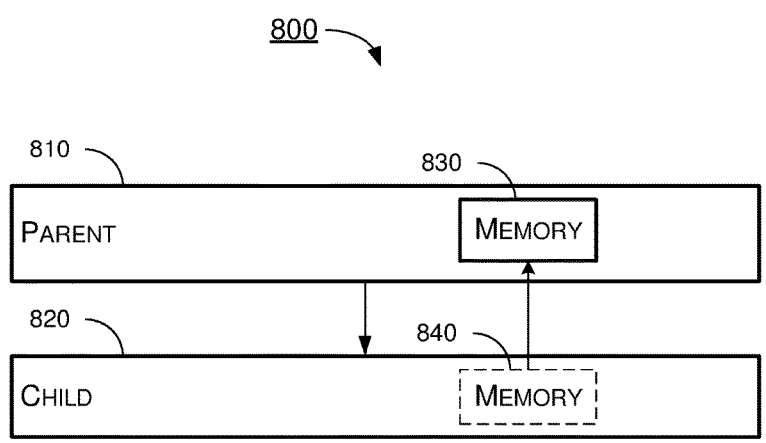
FIG. 8 is a diagram of an example scenario under a conventional approach.
Figure 9:
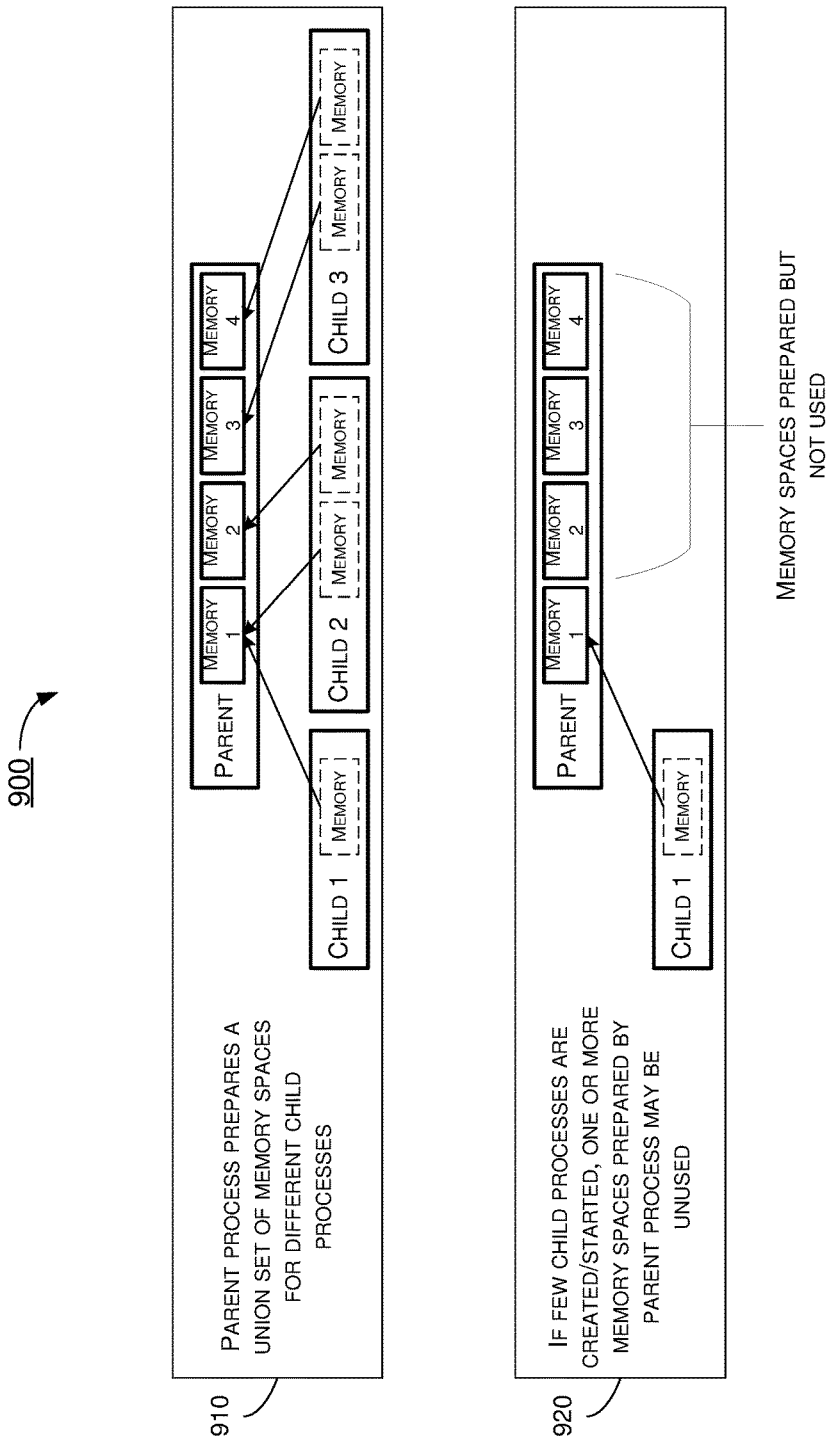
FIG. 9 is a diagram of another example scenario under a conventional approach.

FIG. 7 illustrates an example process 700 in accordance with an implementation of the present disclosure. Process 700 may include one or more operations, actions, or functions as represented by one or more blocks such as blocks 710 and 720. Although illustrated as discrete blocks, various blocks of process 700 may be divided into additional blocks, combined into fewer blocks, or eliminated, depending on the desired implementation. The blocks may be performed in the order shown in FIG. 7 or in any other order, depending on the desired implementation. Process 700 may be implemented by device 200 and/or apparatus 300. Solely for illustrative purpose and without limiting the scope of the present disclosure, process 700 is described below in the context of process 700 being performed by apparatus 300. Process 700 may begin at 710.

At 710, process 700 may involve processor(s) 310 of apparatus 300 analyzing memory usage data of a plurality of child processes of a parent process to determine whether there is a need to start a first child process of the plurality of child processes. For instance, process 700 may involve processor(s) 310 of apparatus 300 determining whether a shared memory space is to be prepared by the parent process for use by at least a first child process based at least in part on the analyzing. Process 700 may proceed from 710 to 720.

At 720, process 700 may involve processor(s) 310 of apparatus 300 preparing a first memory space used by a first child process of the plurality of child processes without a shared memory space prepared by the parent process for use by at least the first child process responsive to a determination of the need to start the first child process. For instance, process 700 may involve processor(s) 310 of apparatus 300 starting the parent process, which starts the first child process, without the parent process preparing the shared memory space such that the first child process prepares the first memory space that is used by the first child process.

In some implementations, in preparing the first memory space used by the first child process, process 700 may involve processor(s) 310 of apparatus 300 starting the parent process, which starts the first child process, without the parent process preparing the shared memory space such that the first child process prepares the first memory space that is used by the first child process.

In some implementations, process 700 may also involve processor(s) 310 of apparatus 300 starting one or more child processes of the plurality of child processes in addition to the first child process without the parent process preparing the shared memory space such that each of the one or more child processes prepares a respective memory space that is used by the respective child process.

Alternatively or additionally, process 700 may also involve processor(s) 310 of apparatus 300 starting one or more child processes of the plurality of child processes in addition to the first child process. Moreover, process 700 may further involve processor(s) 310 of apparatus 300 preparing the shared memory space that is shared by two or more of the first child process and the one or more child processes in response to a quantity of the first child process plus the one or more child processes exceeding a first threshold amount and an amount of time that the first child process and the one or more child processes have run simultaneously exceeding a second threshold amount.

Alternatively or additionally, process 700 may also involve processor(s) 310 of apparatus 300 starting one or more child processes of the plurality of child processes in addition to the first child process. Moreover, process 700 may further involve processor(s) 310 of apparatus 300 stopping the parent process after the first child process and each of the one or more child processes have stopped.

In some implementations, process 700 may also involve processor(s) 310 of apparatus 300 analyzing the memory usage data of the plurality of child processes and determining whether the shared memory space is to be prepared by the parent process for use by at least the first child process based at least in part on the analyzing. In some implementation, in determining whether the shared memory space is to be prepared based at least in part on the analyzing, process 700 may involve processor(s) 310 of apparatus 300 determining that there is a need to prepare the shared memory space by the parent process in response to the analyzing indicating at least a first threshold amount of child processes of the plurality of child processes have run simultaneously for at least a second threshold amount of time based on the memory usage data.

In some implementations, the memory usage data may include one or more types of data including data on how many child processes of the plurality of child processes running simultaneously for how long, how many times a memory space prepared by the parent process is used, a frequency of one or more memory spaces prepared by the parent process being used, whether a same memory space is accessed by more than one child process of the plurality of child processes, whether more than one child process of the plurality of child processes need a same type of data, and data indicating that a memory segment is to be shared among more than one child process of the plurality of child processes.

In some implementations, the determination of the need to start the first child process of the plurality of child processes may be performed before the parent process has been started.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
    analyzing memory usage data of a plurality of child processes of a parent process; and
    determining whether a shared memory space is to be prepared by the parent process for use by at least a first child process based at least in part on the analyzing,
    wherein the determining of whether the shared memory space is to be prepared by the parent process for use by at least the first child process based at least in part on the analyzing comprises determining that there is a need to prepare the shared memory space by the parent process in response to the analyzing indicating at least a first threshold amount of child processes of the plurality of child processes have run simultaneously for at least a second threshold amount of time based on the memory usage data.

2. The method of claim 1, further comprising: starting the parent process, which starts the first child process, without the parent process preparing the shared memory space such that the first child process prepares the first memory space that is used by the first child process.

3. The method of claim 2, further comprising:
    starting one or more child processes of the plurality of child processes in addition to the first child process without the parent process preparing the shared memory space such that each of the one or more child processes prepares a respective memory space that is used by the respective child process.

4. The method of claim 2, further comprising:
    starting one or more child processes of the plurality of child processes in addition to the first child process; and
    preparing the shared memory space that is shared by two or more of the first child process and the one or more child processes in response to a quantity of the first child process plus the one or more child processes exceeding a first threshold amount and an amount of time that the first child process and the one or more child processes have run simultaneously exceeding a second threshold amount.

5. The method of claim 2, further comprising:
starting one or more child processes of the plurality of child processes in addition to the first child process; and
stopping the parent process after the first child process and each of the one or more child processes have stopped.

6. The method of claim 1, wherein the memory usage data comprises one or more types of data including data on how many child processes of the plurality of child processes running simultaneously for how long, how many times a memory space prepared by the parent process is used, a frequency of one or more memory spaces prepared by the parent process being used, whether a same memory space is accessed by more than one child process of the plurality of child processes, whether more than one child process of the plurality of child processes need a same type of data, and data indicating that a memory segment is to be shared among more than one child process of the plurality of child processes.

7. The method of claim 1, further comprising: determining whether there is a need to start the first child process of the plurality of child processes before the parent process has been started.

8. A method, comprising:
collecting memory usage data of a plurality of child processes of a parent process;
determining a need to start a first child process of the plurality of child processes;
starting the parent process, which starts the first child process, without the parent process preparing a shared memory space to be shared with at least the first child process such that the first child process prepares a first memory space that is used by the first child process;
analyzing the collected memory usage data of the plurality of child processes; and
determining whether the shared memory space is to be prepared based at least in part on the analyzing,
wherein the determining of whether the shared memory space is to be prepared based at least in part on the analyzing comprises determining that there is a need to prepare the shared memory space by the parent process in response to the analyzing indicating at least a first threshold amount of child processes of the plurality of child processes have run simultaneously for at least a second threshold amount of time based on the collected memory usage data.

9. The method of claim 8, further comprising:
starting one or more child processes of the plurality of child processes in addition to the first child process without the parent process preparing the shared memory space such that each of the one or more child processes prepares a respective memory space that is used by the respective child process.

10. The method of claim 8, further comprising:
starting one or more child processes of the plurality of child processes in addition to the first child process; and
preparing the shared memory space that is shared by two or more of the first child process and the one or more child processes in response to a quantity of the first child process plus the one or more child processes exceeding a first threshold amount and an amount of time that the first child process and the one or more child processes have run simultaneously exceeding a second threshold amount.

11. The method of claim 8, further comprising:
starting one or more child processes of the plurality of child processes in addition to the first child process; and
stopping the parent process after the first child process and each of the one or more child processes have stopped.

12. The method of claim 8, wherein the determining of the need to start the first child process of the plurality of child processes is performed before starting the parent process.

13. An apparatus, comprising:
a memory comprising:
a usage collection module configured to maintain a record of memory usage data of a plurality of child processes of a parent process and whether any child process of the plurality of child processes is about to be started;
a memory preparation module configured to prepare a memory space associated with the parent process;
a decision module configured to adaptively decide whether a shared memory space needs to be prepared according to the record maintained by the usage collection module; and
a control module configured to start the parent process responsive to a determination that at least one child process of the plurality of child processes is to be started;
wherein the decision module adaptively decides whether a shared memory space needs to be prepared according to the record maintained by the usage collection module by determining whether the record indicates at least a first threshold amount of child processes of the plurality of child processes have run simultaneously for at least a second threshold amount of time based on the collected memory usage data.

14. The apparatus of claim 13, wherein the control module is further configured to perform operations comprising:
determining a need to start a first child process of the plurality of child processes; and
starting the parent process, which starts the first child process, without the parent process preparing the shared memory space to be shared with at least the first child process such that the first child process prepares a first memory space that is used by the first child process.

15. The apparatus of claim 14, wherein the control module is further configured to perform operations comprising:
starting one or more child processes of the plurality of child processes in addition to the first child process without the parent process preparing the shared memory space such that each of the one or more child processes prepares a respective memory space that is used by the respective child process.

16. The apparatus of claim 14, wherein the control module is further configured to start one or more child processes of the plurality of child processes in addition to the first child process and the decision module is further configured to perform operations comprising:
triggering the memory preparation module to prepare the shared memory space that is shared by two or more of the first child process and the one or more child processes in response to a quantity of the first child process plus the one or more child processes exceeding a first threshold amount and an amount of time that the first child process and the one or more child processes have run simultaneously exceeding a second threshold amount.

17. The apparatus of claim 14, wherein the control module is further configured to perform operations comprising:
starting one or more child processes of the plurality of child processes in addition to the first child process; and
stopping the parent process after the first child process and each of the one or more child processes have stopped.

* * * * *